United States Patent
Hansson et al.

[11] Patent Number: 6,035,615
[45] Date of Patent: Mar. 14, 2000

[54] PACKAGING UNIT FOR CONTINUOUSLY PRODUCING SEALED PACKAGES, CONTAINING POURABLE FOOD PRODUCTS, FROM A TUBE OF PACKAGING MATERIAL

[75] Inventors: Lennart Hansson, Bjarred; Felix Dunge, Gothenburg, both of Sweden

[73] Assignee: Tetra Laval Holdings & Finance S.A., Pully, Switzerland

[21] Appl. No.: 09/094,693

[22] Filed: Jun. 15, 1998

[30] Foreign Application Priority Data

Jun. 27, 1997 [EP] European Pat. Off. ............. 97830312

[51] Int. Cl.[7] ....................................... B65B 9/06
[52] U.S. Cl. ........................... 53/551; 53/374.5; 493/302
[58] Field of Search .................... 53/551, 552, 374.5; 493/302

[56] References Cited

U.S. PATENT DOCUMENTS

| | | |
|---|---|---|
| Re. 33,467 | 12/1990 | Steck ......................................... 53/551 |
| 2,738,631 | 3/1956 | Järund . |
| 2,741,079 | 4/1956 | Rausing . |
| 2,784,540 | 3/1957 | Järund . |
| 2,959,901 | 11/1960 | Conti . |
| 3,300,944 | 1/1967 | Thesing . |
| 3,320,718 | 5/1967 | Thesing . |
| 3,388,525 | 6/1968 | Thesing et al. . |
| 3,444,792 | 5/1969 | Thesing et al. . |
| 3,555,652 | 1/1971 | Ignell . |
| 3,729,894 | 5/1973 | Stohlquist . |
| 4,074,961 | 2/1978 | Reil . |
| 4,387,547 | 6/1983 | Reil . |
| 4,817,366 | 4/1989 | Konzal et al. . |
| 4,881,360 | 11/1989 | Konzal et al. . |
| 4,947,618 | 8/1990 | Schneider ................................. 53/552 |
| 5,001,891 | 3/1991 | Abate ....................................... 53/551 |
| 5,155,980 | 10/1992 | Mansson et al. . |

FOREIGN PATENT DOCUMENTS

1155206  6/1969  United Kingdom .

*Primary Examiner*—John Sipos
*Attorney, Agent, or Firm*—Burns, Doane, Swecker & Mathis, L.L.P.

[57] ABSTRACT

A packaging unit (1) for continuously producing aseptic sealed packages (2), containing a pourable food product, from a tube (14) of packaging material filled with the food product; the unit (1) has a first and second chain conveyor (10, 11) respectively having a number of jaws (12) and a number of counter-jaws (13), which interact with and grip the tube (14) to heat-seal the tube at successive cross sections by means of induction heating elements (29) on the jaws (12); and the jaws (12) and counter-jaws (13) are guided along respective work paths by pairs of cams (50, 51) having different profiles for controlling interaction of the jaws (12) and counter-jaws (13) with the tube (14) of packaging material.

11 Claims, 8 Drawing Sheets

PACKAGING UNIT FOR CONTINUOUSLY PRODUCING SEALED PACKAGES, CONTAINING POURABLE FOOD PRODUCTS, FROM A TUBE OF PACKAGING MATERIAL

This application claims priority under 35 U.S.C. §§119 and/or 365 to No. 97830312.1 filed in the EPO on Jun. 27, 1997; the entire content of which is hereby incorporated by reference.

The present invention relates to a packaging unit for continuously producing aseptic sealed packages, containing pourable food products, from a tube of packaging material.

More specifically, the packaging unit according to the present invention provides for producing substantially parallelepiped aseptic sealed packages.

Many pourable food products, such as fruit juice, pasteurized or UHT (ultra-high-temperature treated) milk, wine, tomato sauce, etc., are sold in packages made of sterilized packaging material.

A typical example of such a package is the parallelepiped packaging container for liquid or pourable food products known by the name of Tetra Brik Aseptic (registered trademark), which is formed by folding and sealing a strip-rolled packaging material. The rolled packaging material comprises layers of fibrous material, e.g. paper, covered on both sides with thermoplastic material, e.g. polyethylene; and the side of the packaging material eventually contacting the food product in the package also comprises a layer of barrier material, e.g. an aluminium sheet, in turn covered with a layer of thermoplastic material.

As is known, packages of the above type are produced on fully automatic packaging machines, on which a continuous tube is formed from the packaging material supplied in strip form. The strip of packaging material is sterilized on the packaging machine, e.g. by applying a chemical sterilizing agent, such as a hydrogen peroxide solution; following sterilization, the sterilizing agent is removed, e.g. vaporized by heating, from the surfaces of the packaging material; and the strip of packaging material so sterilized is kept in a closed sterile environment, and is folded and sealed longitudinally to form a tube.

The tube is filled with the sterilized or sterile-processed food product, and is sealed at equally spaced cross sections at which it is then cut into pillow-pack packets, which are subsequently folded mechanically into parallelepiped packages.

Packaging machines of the above type are known, in which the sections of the tube are sealed by two jaw units moved by respective arms so as to alternately grip the tube at successive sections for sealing. One jaw of each jaw unit comprises an induction heating element for locally melting the thermoplastic material when the jaw unit is gripped on to the tube, and so welding the thermoplastic covering to seal a cross section of the tube.

Each jaw unit performs a relatively complex operating cycle, in which the respective jaws are brought into contact with the tube at an upper station of the packaging machine; and the unit, firmly gripping the tube, is lowered, together with the tube, along the feed axis of the tube to seal the cross section, and is then opened at a lower station of the packaging machine. The same cycle, offset by a time interval corresponding to the output rate of the machine, is also performed by the second unit, so that each package is formed by a portion of the tube extending between a first seal made by one jaw unit, and a second seal made successively by the other jaw unit.

Though widely used and dependable, known machines of the type described above are limited in terms of output rate, on account of the cyclic reciprocating movement of the large masses involved (arms, jaws and respective actuators), the inertia of which limits the output rate to a few thousand cycles/hour, over and above which, dynamic problems are encountered such as to impair operation of the machine.

To increase the output rate of such machines, continuous packaging units have been proposed, which comprise two chain conveyors defining respective endless paths and respectively fitted with a number of jaws and counter-jaws. The two paths comprise respective branches substantially facing and parallel to each other, and between which the tube of packaging material is fed; and the jaws on one conveyor cooperate, along said branches of the respective paths, with corresponding counter-jaws on the other conveyor to grip the tube at a number of successive cross sections and so seal the packages. Continuous chain conveyor systems provide, to some extent, for eliminating the dynamic problems and so increasing the maximum output rates imposed by reciprocating systems.

Machines of this sort are illustrated in numerous prior patents, such as U.S. Pat. No. Re. 33 467 and U.S. Pat. No. 5,001,891, and have been experimented for some time.

To the Applicant's knowledge, however, such machines have failed, as yet, to find a satisfactory practical application, due to known chain conveying mechanisms failing, as yet, to provide for a reliable production process ensuring absolutely no damage to the packages, and so safeguarding the aseptic characteristics of the contents.

The above drawbacks are mainly due to the impossibility of controlling the movement of the jaws and counter-jaws, particularly upon impact of the jaws and counter-jaws with the tube of packaging material.

It is an object of the present invention to provide a packaging unit for continuously producing aseptic sealed packages containing pourable food products, and which provides for eliminating the aforementioned drawbacks typically associated with known machines.

According to the present invention, there is provided a packaging unit for continuously producing aseptic sealed packages, containing a pourable food product, from a tube made of heat-seal packaging material in sheet form and fed along a vertical supply path; said tube being filled with said food product; and said unit comprising:

a first chain conveyor having a number of jaws, and defining an endless first path along which said jaws are fed;

a second chain conveyor having a number of counter-jaws, and defining an endless second path along which said counter-jaws are fed;

said first and said second path comprising respective work portions adjacent to said supply path of the tube of packaging material, and extending symmetrically on opposite sides of said supply path, so that said jaws of said first conveyor cooperate with respective said counter-jaws of said second conveyor along at least part of the respective said work portions, to grip said tube at respective equally spaced cross sections;

at least said jaw:; comprising heating means for heat-sealing said tube;

said unit also comprising, along said respective work portions, first cam guide means for guiding said jaws, and second cam guide means for guiding said counter-jaws; and said jaws and said counter-jaws comprising cam-following means cooperating with said respective first and second cam guide means;

characterized in that said first and second cam guide means comprise at least a pair of cams having different profiles along at least part of said respective work portions; said cam-following means comprising, for each said jaw and counter-jaw, at least a pair of cam-following elements, each cooperating with a respective cam in a said pair of cams.

Using two different cams with appropriately combined profiles provides for accurately controlling the movement of the jaws and counter-jaws, and so achieving optimum interaction with the packaging material, which is thus safeguarded against excessive pressure or dynamic stress by which it may be damaged.

More specifically, using two cams allows greater freedom in defining the trajectory, provides for optimizing the speed and acceleration of the jaws and counter-jaws in a way which would be impossible using only one cam, and provides for compensating the "polygon effect", i.e. irregular movement, typically associated with chain drives.

Moreover, the regular movement of the jaws and counter-jaws ensures contact is maintained between the cams and respective cam followers even in the presence of relatively slack chains.

According to a preferred embodiment of the invention, each jaw and counter-jaw comprises two pairs of cam-following elements located close to the opposite ends of the jaw and associated with respective pairs of cams.

A preferred, non-limiting embodiment of the present invention will be described by way of example with reference to the accompanying drawings, in which.

Figure 1:
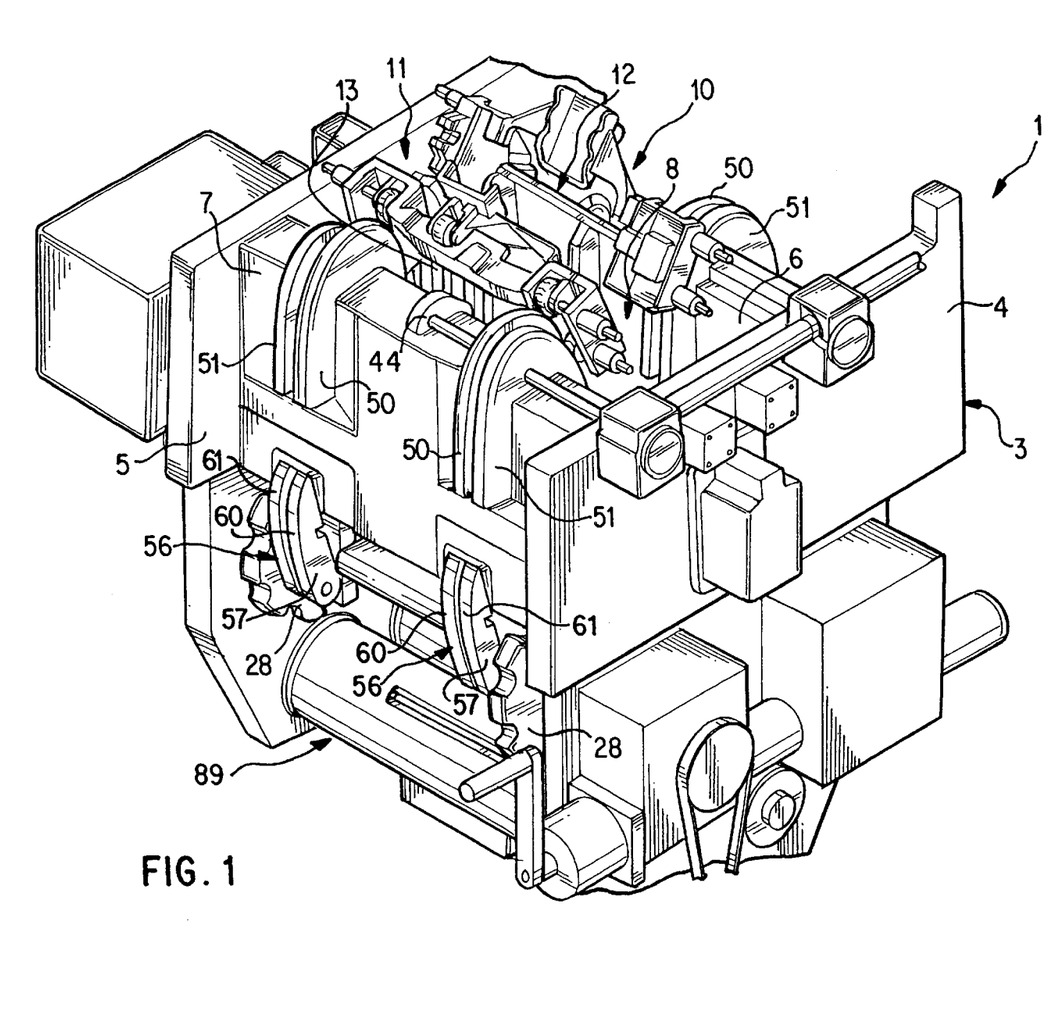
FIG. 1 shows a view in perspective, with parts removed for clarity, of a packaging unit in accordance with the teachings of the present invention.
Figure 2:
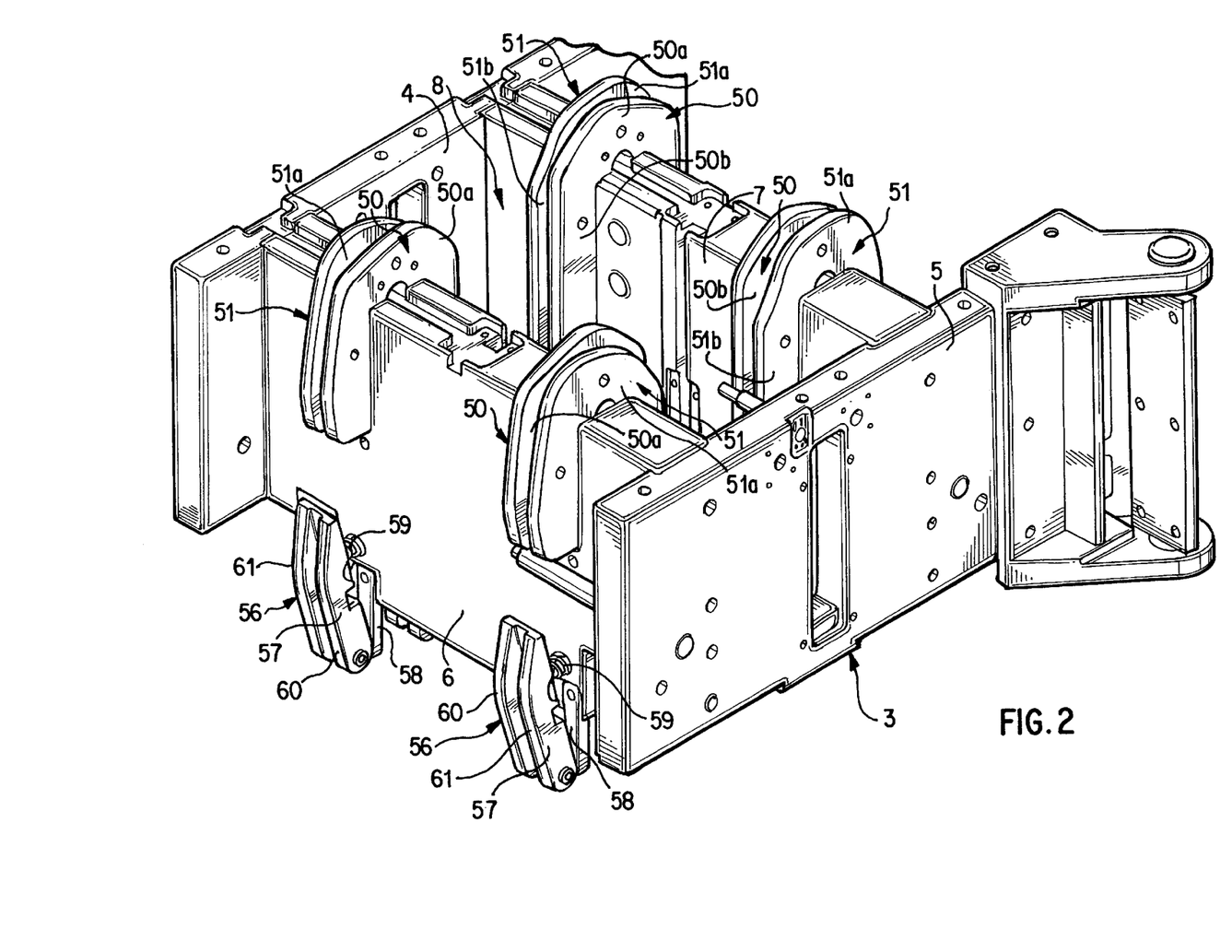
FIG. 2 shows a view in perspective of a frame of the FIG. 1 unit.
Figure 3:
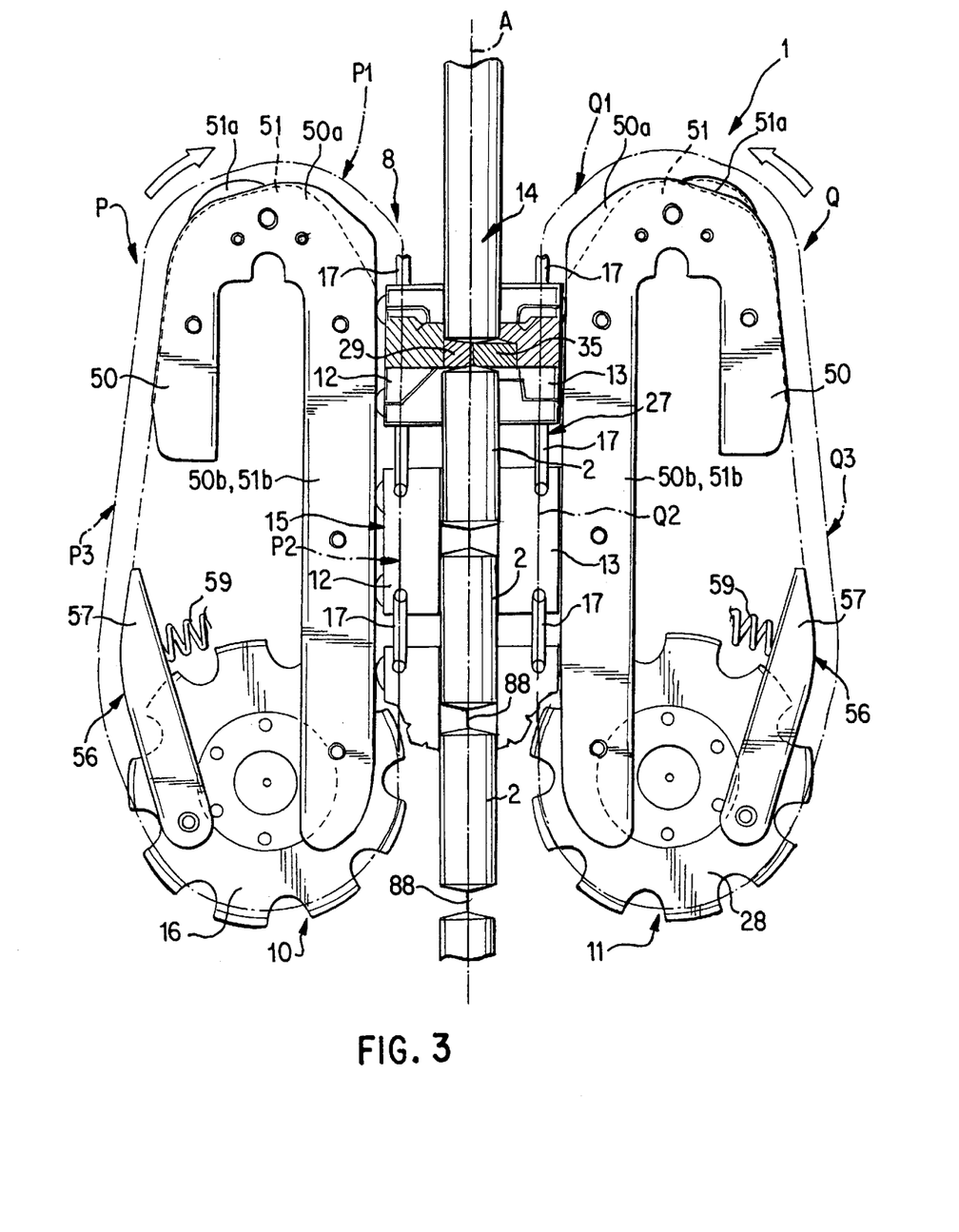
FIG. 3 shows a schematic side view, with parts removed for clarity, of the FIG. 1 unit.

With reference to FIGS. 1 to 3, number 1 indicates a packaging unit for continuously producing, from a tube 14 of packaging material, aseptic sealed packages 2 (FIG. 3) containing a pourable food product, such as pasteurized or UHT milk, fruit juice, wine, etc.

Tube 14 is formed in known manner upstream from unit 1 by longitudinally folding and sealing a strip of heat-seal material, and is filled upstream with the sterilized or sterile-processed food product for packaging.

Unit 1 comprises a frame 3 (FIG. 2) defined by two side walls 4, 5 and by two parallel transverse walls 6, 7 fitted rigidly between side walls 4, 5 and defining, with side walls 4, 5, an opening 8; and two chain conveyors 10, 11 fitted to frame 3 and respectively comprising jaws 12 (only one shown in FIG. 1) and counter-jaws 13 (only one shown in FIG. 1) cooperating with each other to interact with the tube 14 of packaging material fed along a vertical path A through opening 8.

Conveyors 10 and 11 define respective endless paths P and Q along which jaws 12 and counter-jaws 13 are fed (FIG. 3), and which respectively extend about walls 6 and 7 of frame 3.

Conveyor 10 comprises an articulated chain 15 extending along path P; and two drive wheels 16 meshing with and on both sides of chain 15 at the bottom end of path P. Jaws 12 are an integral part of and define alternate links of chain 15, and are connected to one another in articulated manner by pairs of links 17.

More specifically, each jaw 12 (FIGS. 4 and 5) comprises an elongated main body 20 extending in a direction perpendicular to path A and parallel to wall 6, and having respective end projections 21 and 22, each of which has a projecting first and second pin 23, 24 spaced with respect to each other and having respective axes 25, 26 parallel to the main dimension of body 20. Links 17 pivot on pins 23, 24 of jaws 12 so as to connect pins 23 of one jaw 12 to pins 24 of the adjacent jaw.

Similarly, conveyor 11 comprises an articulated chain 27 extending along path Q; and two drive wheels 28 meshing with chain 27 at the bottom end of path Q. Chain 27 is defined by a number of counter-jaws 13 connected in articulated manner to one another and only described in detail insofar as they differ from jaws 12, and using the same numbering system for any parts similar or corresponding to those described in connection with jaws 12. Briefly, each counter-jaw 13 comprises a main body 20 having pairs of end pins 23, 24 about which links 17 pivot to connect adjacent pairs of counter-jaws 13.

Each jaw 12 comprises an induction heating element 29 fitted to main body 20 in a direction crosswise to path A of tube 14, and which in turn comprises a pair of straight, parallel active surfaces 30, and is supplied electrically by a pair of contact brushes 34 cooperating in sliding manner, in use, with a supply bar (not shown) fitted to frame 3 and extending in the region of path P inside opening 8.

As opposed to a heating element 29, each counter-jaw 13 comprises a pressure bar 35 (FIG. 5), which cooperates with heating element 29 of corresponding jaw 12 to grip a cross section of tube 14 (FIG. 3). On a front surface 46 facing corresponding jaw 12 in use, bar 35 comprises two bands 36 of relatively flexible elastomeric material, which cooperate with the packaging material in opposition to the active surfaces 30 of heating element 29. Bar 35 is connected to main body 20 by two supporting assemblies 47—not forming part of the present invention, and therefore not described in detail—which flex in the direction of the gripping pressure exchanged, in use, between counter-jaw 13 and corresponding jaw 12.

Jaws 12 and counter-jaws 13 each comprise a respective control device 37 for controlling the volume of package 2 as it is being formed. Each device 37—not forming part of the present invention, and therefore not described in detail—substantially comprises a half shell 38 hinged to main body 20 about an axis 39 parallel to axes 25, 26 by two lateral supporting brackets 40 integral with half shell 38, which cooperates frontally with a complementary half shell to form a substantially parallelepiped cavity housing package 2 as it is being formed. Each device 37 also comprises a cam follower roller 42 fitted idly to a supporting bracket 43 extending integrally from the rear of respective half shell 38.

Cam followers 42 of jaws 12 and counter-jaws 13 cooperate with respective cams 44 fitted to walls 6 and 7 of frame 3, and of which only the one relative to conveyor 11 is shown in FIG. 1.

According to the present invention, the movement of jaws 12 and counter-jaws 13 is controlled by respective pairs of cams 50, 51 fitted to walls 6, 7 of frame 3 and cooperating with respective pairs of rollers 52, 53 fitted to jaws 12 and counter-jaws 13.

Figure 4:
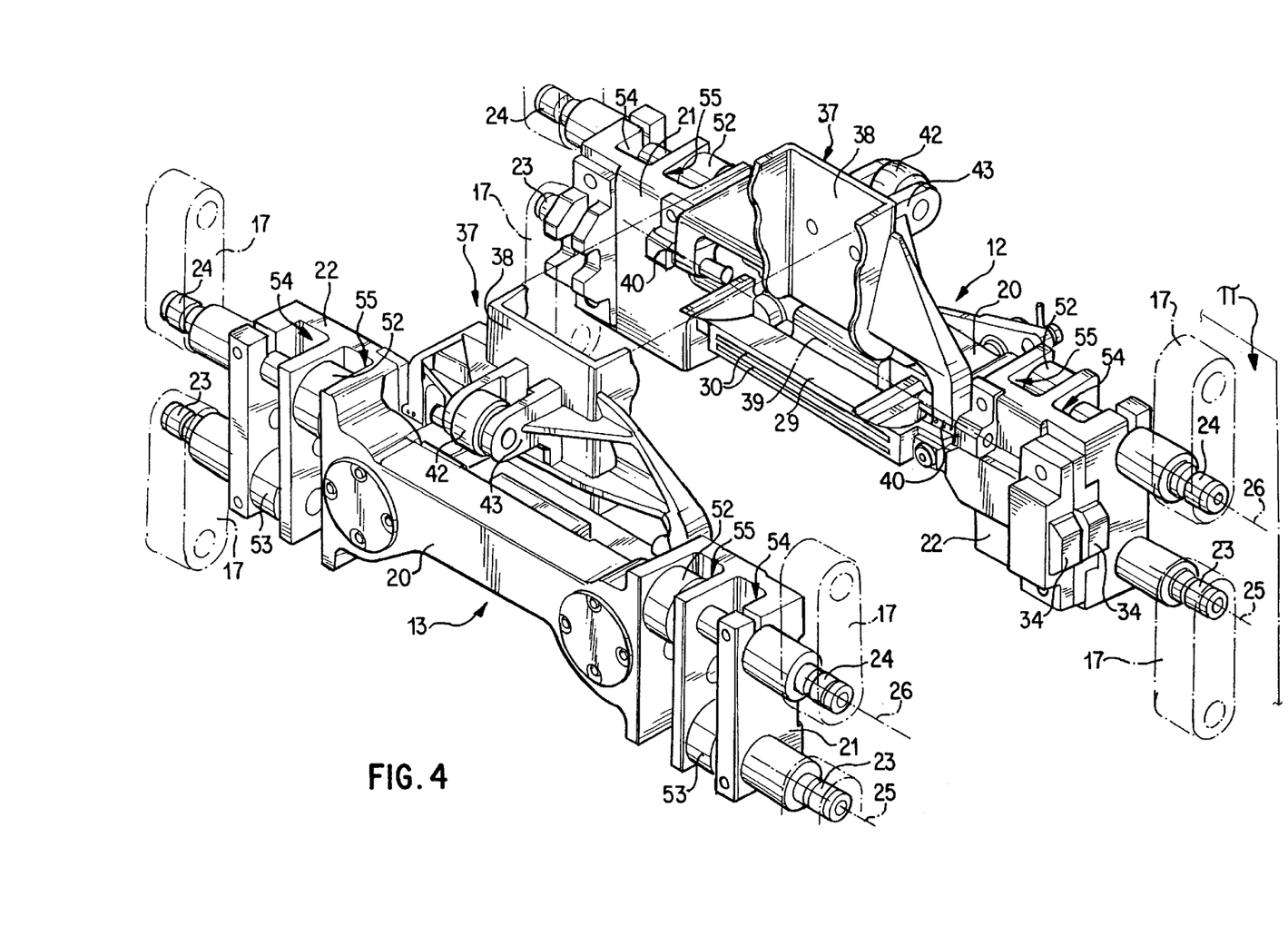
FIGS. 4 and 5 show views in perspective, from opposite sides, of a jaw and corresponding counter-jaw of the FIG. 1 unit.
Figure 5:
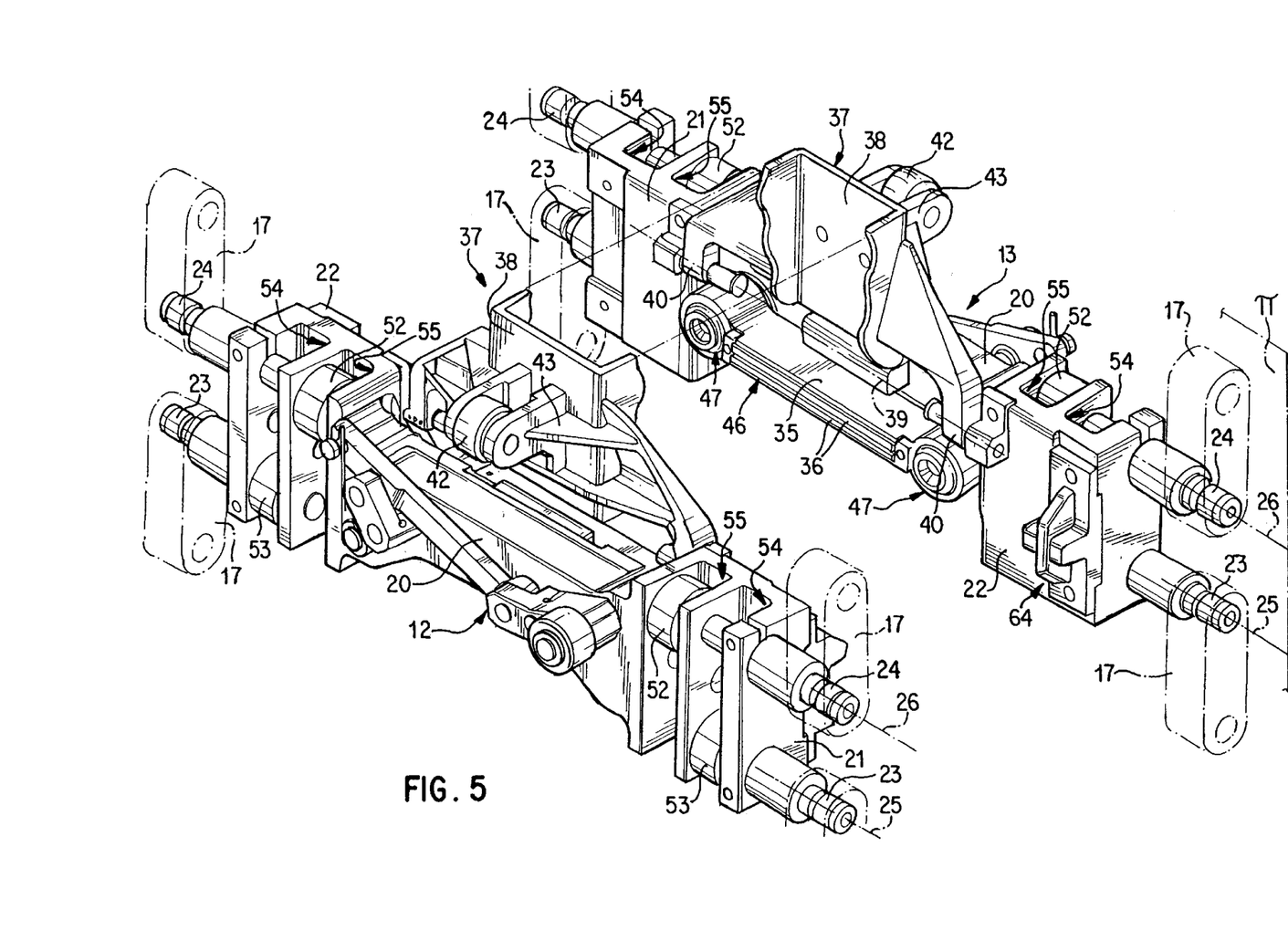

More specifically, and as shown in FIGS. 4 and 5, jaws 12 and counter-jaws 13 each comprise a first pair of rollers 52, 53 fitted idly inside end projection 21 of main body 20, and a second pair of rollers 52, 53 fitted idly inside end projection 22 of main body 20; and projections 21, 22 each comprise a pair of parallel, side by side seats 54, 55 formed on the rear side (i.e. the side facing away from heating element 29 or pressure bar 35) and extending in a direction perpendicular to axes 25, 26 of pins 23, 24 and parallel to the plane π defined by axes 25, 26.

The roller 53 in each pair is housed inside a respective outer seat 54 (i.e. closer to the end of body 20) and fitted to a respective pin 23; and the roller 52 in each pair is housed inside a respective inner seat 55 and fitted to a respective pin 24.

Wall 6 (FIG. 2) is fitted with two pairs of cams 50, 51 with which respective pairs of rollers 52, 53 of jaws 12 cooperate in rolling manner; and, similarly, wall 7 is fitted with two pairs of cams 50, 51 with which respective pairs of rollers 52, 53 of counter-jaws 13 cooperate in rolling manner.

Cams 50, 51 comprise respective substantially U-shaped portions 50*a*, 51*a* extending about the top edge of respective walls 6, 7 to define, for respective chains 15, 27 of conveyors 10, 11, a transmission opposite respective drive wheels 16 and 28; and respective portions 50*b*, 51*b* extending vertically along respective walls 6, 7, inside opening 8. Portions 50*a*, 51*a* (FIG. 3) define path portions P1, Q1 along which jaws 12 and counter-jaws 13 approach and contact tube 14 of packaging material; and portions 50*b*, 51*b* define facing, parallel path portions P2, Q2 along which jaws 12 and counter-jaws 13 are maintained contacting under pressure to form the seals defining packages 2.

Cams 50, 51 release respective chains 15, 27 at respective portions P3, Q3 of paths P and Q downstream from respective drive wheels 16, 28.

Along portions P3, Q3, chains 15, 27 cooperate with respective pairs of tensioners 56 for so tensioning the chains as to ensure rollers 52, 53 of jaws 12 and counter-jaws 13 are maintained contacting relative cams 50, 51.

Each tensioner 56 comprises a movable shoe 57 hinged about a horizontal axis to a support 58 fixed to wall 6 or 7; and a spring 59 interposed between shoe 57 and wall 6 or 7. On the face facing away from wall 6 or 7, shoe 57 comprises two side by side rolling tracks 60, 61, which, by virtue of spring 59, cooperate respectively with rollers 52 and 53 of jaws 12 or counter-jaws 13.

The profiles of cams 50, 51 are so designed as to define a number of characteristic positions- shown in FIGS. 6 to 10 and described in detail later on—in which a jaw/counter-jaw pair interacts with tube 14, and to ensure the smoothest possible transition between said positions to prevent undesired stress on the packaging material.

Figure 11:
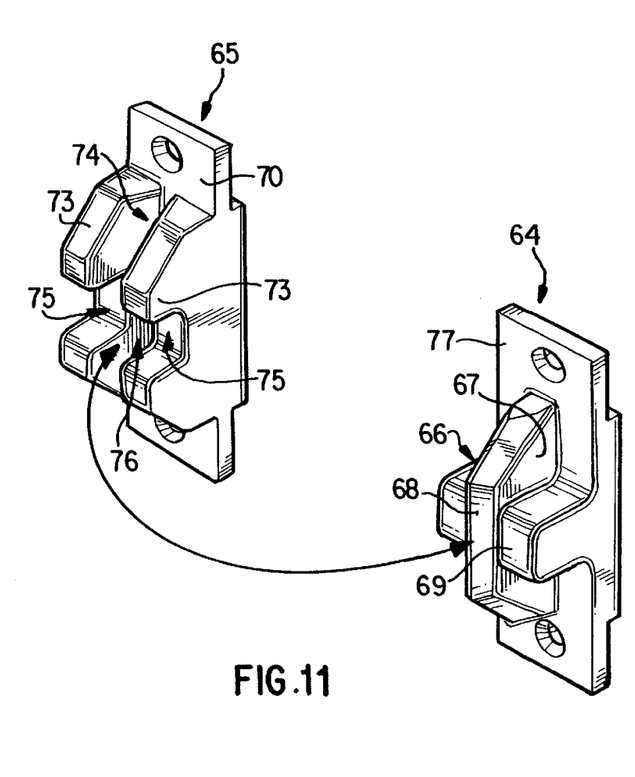
FIG. 11 shows a view in perspective of complementary parts of the jaw and counter-jaw in FIGS. 4 and 5.

Finally, counter-jaws 13 and jaws 12 comprise respective mutual engaging elements 64 and 65 as shown in detail in FIG. 11.

Element 64 substantially comprises a connecting plate 77 fitted to the front face of projection 22 of respective counter-jaw 13; and a substantially cross-shaped projection 66 defined by a vertical portion 67 substantially in the form of an isosceles trapezium with the longer edge coincident with the surface of plate 77 and having a tapered front edge 68, and by a transverse portion 69 intersecting vertical portion 67 at the center line.

Element 65, in turn, comprises a connecting plate 70 fitted to the front face of projection 21 of respective jaw 12; and a pair of vertical, substantially trapezoidal projections 73 parallel to and spaced with respect to each other to define a seat 74 for receiving, in use, portion 67 of corresponding element 64. On the respective front sides, projections 73 comprise respective recesses 75 for housing portion 69 of corresponding element 64, and defining, as a whole and with seat 74, a cross-shaped seat 76 substantially complementary to projection 66 of element 64.

Unit 1 operates as follows.

Conveyors 10, 11 are rotated in known manner in opposite directions, as indicated by the arrows in FIG. 3, so that, from the end of portions P1, Q1 of respective paths P, Q and along respective portions P2, Q2, respective jaws 12 and counter-jaws 13 cooperate with tube 14 of packaging material according to a movement defined by the profiles of cams 50, 51.

Figure 6:
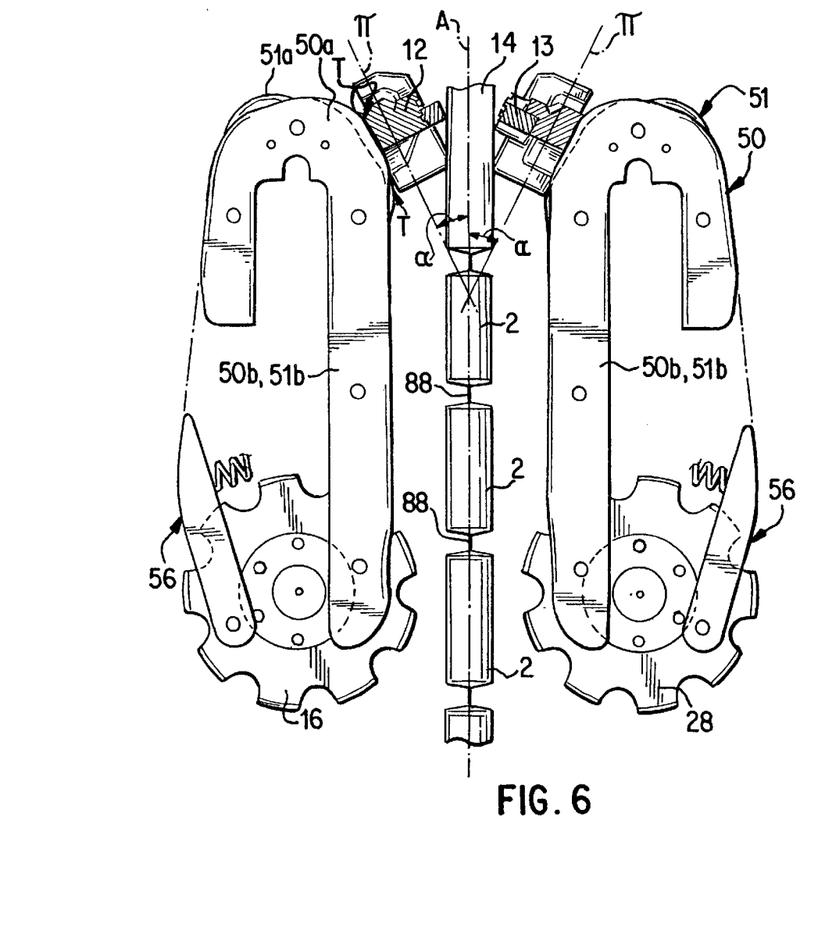
FIGS. 6 to 10 show schematic side views, with parts removed for clarity, of the FIG. 1 unit with a jaw and respective counter-jaw in successive operating positions.
Figure 7:
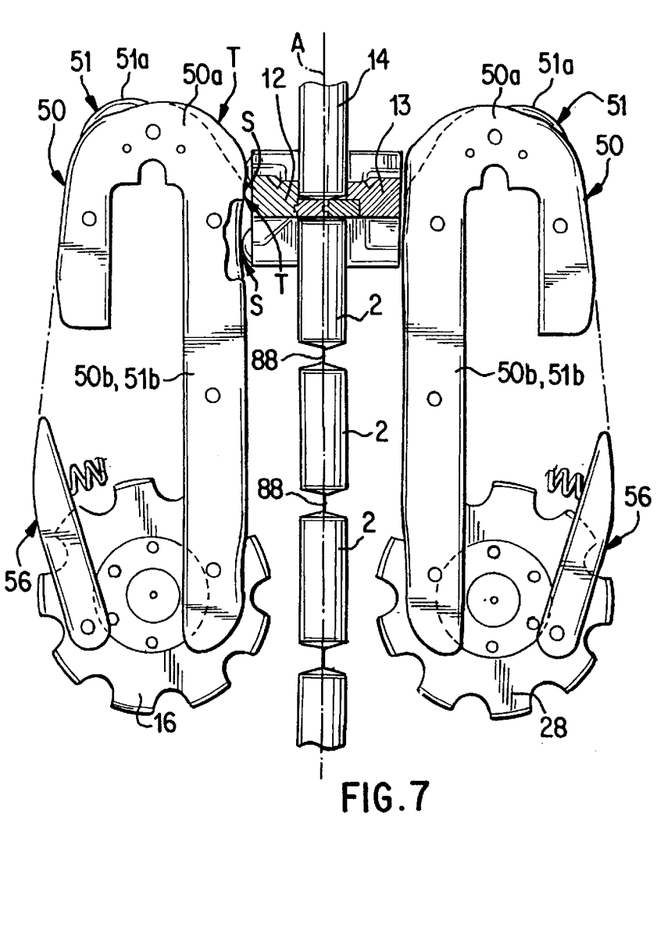

More specifically, FIG. 6 shows the packaging material impact position, i.e. the position in which a jaw 12/counter-jaw 13 pair begins interacting with tube 14. The impact position is established as jaw 12 and corresponding counter-jaw 13 reach the start of respective end portions T of portions 50*a*, 51*a* (i.e. of portions P1, Q1 of respective paths P, Q), and is characterized by a predetermined tube 14 impact angle a formed between the plane π defined by axes 25, 26 and the vertical mid plane of unit 1 containing path A of tube 14, and which ranges between 0–60°, conveniently between 20–30°, and is preferably an angle of about 25°.

Portions T of cams 50, 51 are so formed as to feed jaw 12 and counter-jaw 13 along a substantially curvilinear trajectory into a mating position (FIG. 7) in which they are positioned facing and parallel to each other, but separated by a distance substantially equal to twice the thickness of the packaging material, so that tube 14 is "flattened" at a respective cross section, but not yet subjected to pressure.

Only after jaw 12 and counter-jaw 13 are moved into the above mating position is pressure gradually applied by the slight ramps S formed by cams 50, 51 immediately upstream from respective portions 50*b*, 51*b*.

Figure 8:
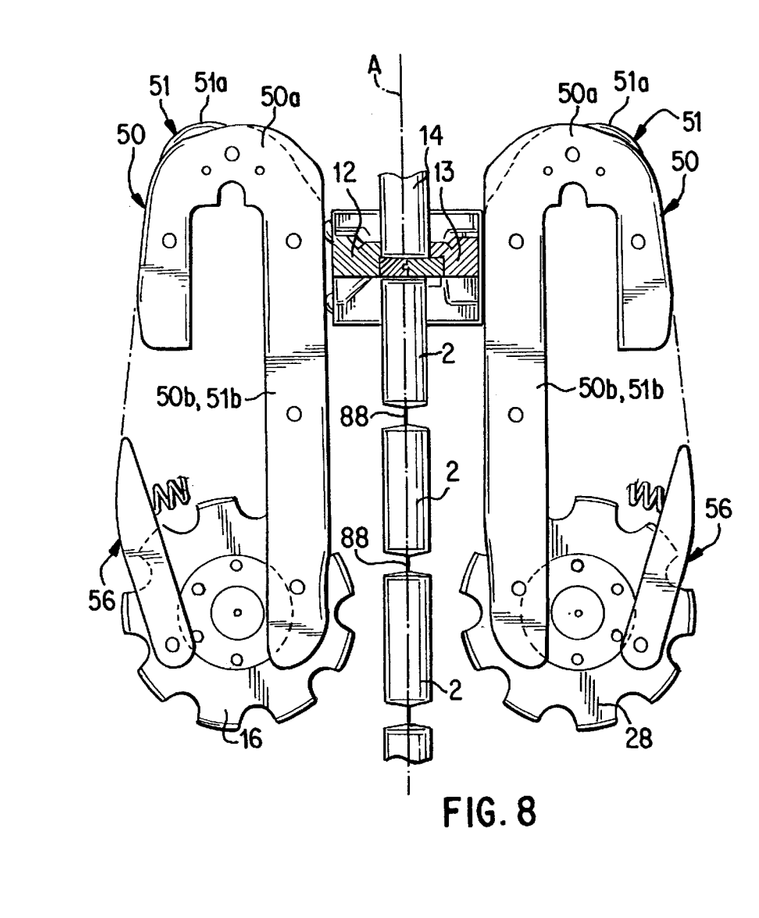
Figure 9:
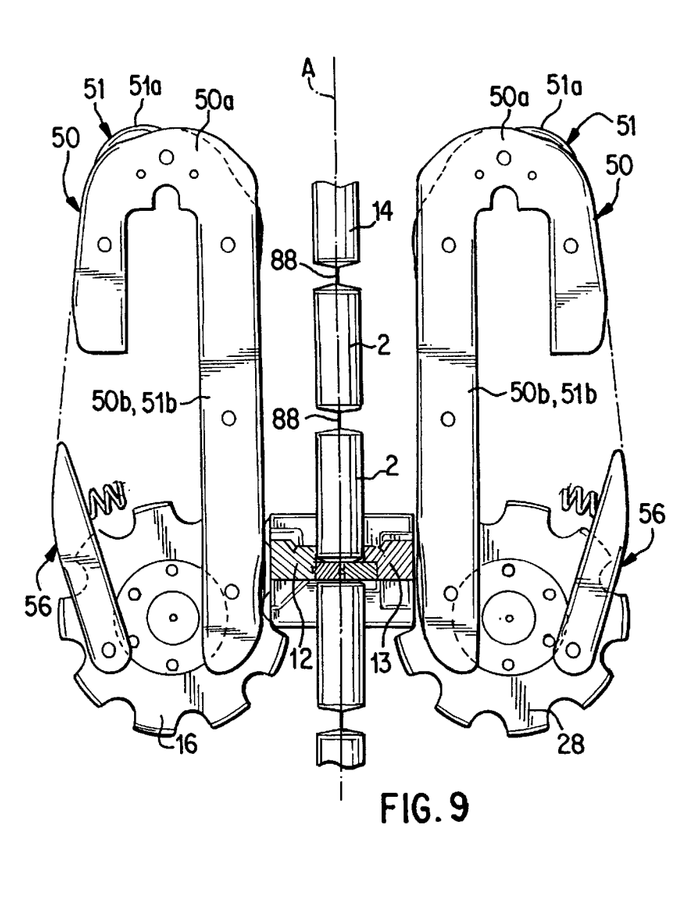
Figure 10:
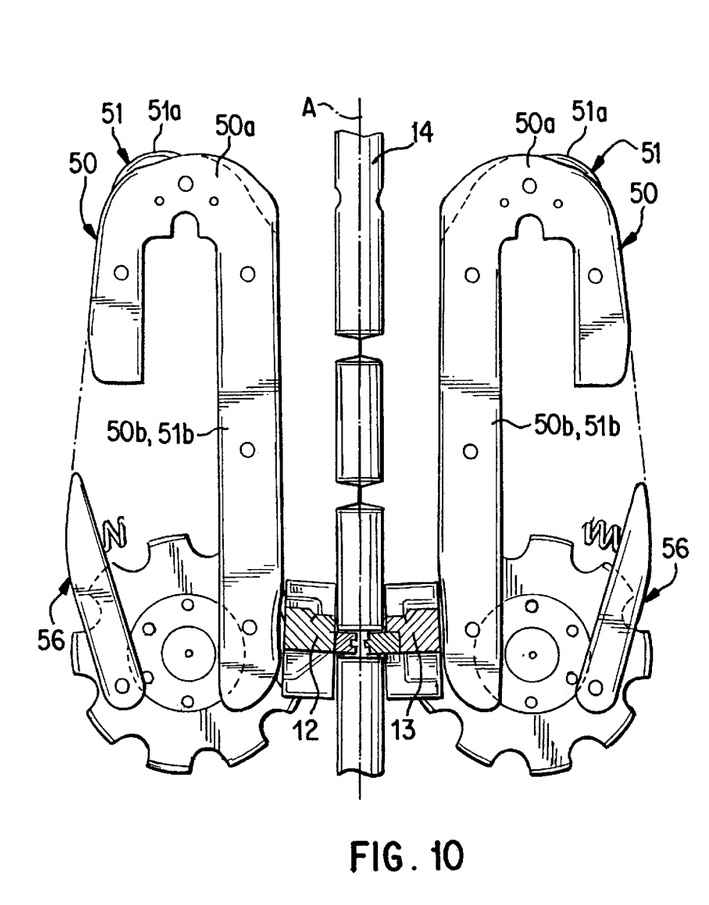

FIGS. 8 and 9 respectively show jaw 12 and counter-jaw 13 at the start and end of the maximum-pressure stage, during which, heating element 29 is supplied by brushes 34 to locally melt the thermoplastic covering of the packaging material. The supply to heating element 29 is cut off before the end of the maximum-pressure stage, so that the thermoplastic covering begins cooling and setting to form the seal while still under pressure, thus ensuring perfect sealing of the package.

At the end of the maximum-pressure stage, jaw 12 and counter-jaw 13 are parted slightly for a brief pressure-release stage, during which (FIG. 10), jaw 12 and counter-jaw 13 are maintained almost parallel to each other to avoid abnormally stressing the packaging material.

On leaving respective portions 50*b*, 51*b* of cams 50, 51, by which time substantially no forces are exchanged any longer between jaw 12 and counter-jaw 13, these are detached from the packaging material by the drive wheels meshing with pins 23, 24.

Along portions P2, Q2 of paths P, Q, each jaw 12 and corresponding counter-jaw 13 are locked to each other laterally and in the traveling direction by engagement of respective elements 65 and 64.

The above operating cycle results in the formation of a continuous succession of packages 2 joined to one another by connecting strips 88, which are cut at a follow-up work station 89 not forming part of the present invention and therefore not described.

The advantages of unit 1 according to the present invention will be clear from the foregoing description.

Using pairs of cams 50, 51 to better control the movement of jaws 12 and counter-jaws 13 provides for optimum interaction of jaws 12 and counter-jaws 13 with the packaging material, thus preventing damage to the packaging material and ensuring correct sealing, both of which factors determine the perfectly aseptic nature of the package, and perfect forming of the package.

As jaws 12 and counter-jaws 13 are guided stably and with substantially no irregular movement induced by the polygon effect, rollers 52, 53 are maintained contacting respective cams 50, 51 even in the presence of a relatively slack chain, thus reducing the loads involved, so that the various parts of the unit may be sized accordingly to also reduce the moving masses involved.

Clearly, changes may be made to unit 1 as described and illustrated herein without, however, departing from the scope of the claims.

We claim:

1. A packaging unit for continuously producing aseptic sealed packages, containing a pourable food product, from a tube made of heat-seal packaging material in sheet form and fed along a vertical supply path said tube being filled with said food product, and said unit comprising:

a first chain conveyor having a number of jaws, and defining an endless first path along which said jaws are fed;

a second chain conveyor having a number of counter-jaws, and defining an endless second path along which said counter-jaws are fed;

said first path and said second path comprising respective work portions adjacent to said tube supply path extending symmetrically on opposite sides of said supply path, so that said jaws of said first conveyor cooperate with respective said counter-jaws of said second conveyor along at least part of the respective said work portions, to grip said tube at respective equally spaced cross sections;

at least said jaws comprising heating means for heat-sealing said tube;

first cam guide means along said respective work portions for guiding said jaws, and second cam guide means along said respective work portions for guiding said counter-jaws, said jaws and said counter-jaws comprising cam-following means cooperating with said respective first and second cam guide means;

wherein said first cam guide means and said second cam guide means each comprise at least a pair of cams, each cam of said pair of cams having a profile different from the other cam of said pair of cams along at least part of said respective work portions, said cam-following means comprising, for each said jaw and counter-jaw, at least a pair of cam-following elements, each cam-following element cooperating with a respective cam in a pair of cams.

2. A unit according to claim 1, wherein each of said jaws and counter-jaws comprises two pairs of cam-following elements located close to opposite ends of the jaw or counter-jaw, said first cam guide means and said second cam guide means each comprising two respective pairs of cams associated with respective pairs of cam-following elements.

3. A unit according to claim 1, wherein said cam-following elements each comprise rollers fitted idly to said jaws and counter-jaws and cooperating in rolling manner with respective cams.

4. A unit according to claim 1, wherein said chain conveyors comprise:

chains including intermediate rods, said jaws and said counter-jaws respectively define alternate links connected to one another in articulated manner by said intermediate rods; and drive wheels meshing with said chains along a bottom portion of the respective paths.

5. A unit according to claim 4, wherein said cams comprise:

respective curved-profile upper portions defining, for said chains, respective transmissions opposite said respective drive wheels, and respectively cooperating with said jaws and said counter-jaws along an approach and impact path portion along which the jaws and counter-jaws approach and contact said tube of packaging material; and respective substantially vertical portions defining facing parallel portions of the respective said paths, along which said jaws and counter-jaws are maintained contacting the packaging material under pressure to form the seals defining said packages.

6. A unit according to claim 5, wherein said curved-profile upper portions of said cams comprise respective end portions defining an impact position wherein said jaws and counter-jaws contact said tube of packaging material, and wherein said jaws and counter-jaws are inclined with respect to the vertical by an angle $\alpha$ ranging between 0–60°.

7. A unit according to claim 6, wherein said angle $\alpha$ equals roughly 25°.

8. A unit according to claim 6, wherein said end portions of said curved-profile upper portions of said cams define a substantially curvilinear trajectory along which said jaws and counter-jaws are fed between said impact position and a mating position wherein each said jaw and a respective said counter-jaw are positioned facing and parallel to each other at a distance substantially equal to twice the thickness of the packaging material.

9. A unit according to claim 8, wherein said end portions of said curved-profile upper portions comprise respective ramps immediately upstream from said facing parallel portions of the respective paths.

10. A unit according to claim 1, wherein said jaws and counter-jaws each comprise first and second mutually engaging elements cooperating with each other at least along said facing parallel portions of the respective paths to mutually lock each jaw to a respective counter-jaw.

11. A unit according to claim 10, wherein one of said mutually engaging elements comprises a substantially cross-shaped projection, and the other of said mutually engaging elements comprises a seat complementary in shape to said projection.

* * * * *